United States Patent
Chao et al.

(10) Patent No.: US 12,353,282 B2
(45) Date of Patent: Jul. 8, 2025

(54) MEMORY DEVICE PPR FAILURE HANDLING SYSTEM

(71) Applicant: Dell Products L.P., Round Rock, TX (US)

(72) Inventors: Ching-Lung Chao, Austin, TX (US); Yiping Zhou, Cypress, TX (US); Yu-Hsuan Chou, New Taipei (TW); Yu-Shuang Liao, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 18/537,401

(22) Filed: Dec. 12, 2023

(65) Prior Publication Data

US 2025/0190303 A1   Jun. 12, 2025

(51) Int. Cl.
*G06F 11/10* (2006.01)
*G06F 11/07* (2006.01)
*G06F 11/14* (2006.01)

(52) U.S. Cl.
CPC ........ *G06F 11/1068* (2013.01); *G06F 11/076* (2013.01); *G06F 11/1441* (2013.01)

(58) Field of Classification Search
None
See application file for complete search history.

(56) References Cited

U.S. PATENT DOCUMENTS

| | | | |
|---|---|---|---|
| 9,202,595 B2 | 12/2015 | Wilson et al. | |
| 2004/0223358 A1* | 11/2004 | Yamamoto | G11C 29/006 365/145 |
| 2017/0192843 A1* | 7/2017 | Warnes | G11C 29/06 |
| 2019/0019569 A1* | 1/2019 | Pope | G11C 29/44 |
| 2020/0133517 A1* | 4/2020 | Shah | G06F 11/076 |
| 2021/0286667 A1* | 9/2021 | Yigzaw | G06F 11/0772 |

OTHER PUBLICATIONS

D.-H. Kim and L. Milor, "An ECC-Assisted Postpackage Repair Methodology in Main Memory Systems," in IEEE Transactions on Very Large Scale Integration (VLSI) Systems, vol. 25, No. 7, pp. 2045-2058, Jul. 2017, (Year: 2017).*
Dell Technologies, "What is DDR4 Self-healing on Dell PowerEdge Servers with Intel Xeon Scalable Processors," Article No. 000053203, Last Published Date: Oct. 18, 2023, Version 14, 4 pages. Retrieved from the Internet: https://www.dell.com/support/kbdoc/en-us/000053203/what-is-ddr4-self-healing-on-dell-poweredge-servers-with-intel-xeon-scalable-processors.

* cited by examiner

*Primary Examiner* — Daniel F. McMahon
(74) *Attorney, Agent, or Firm* — Joseph Mencher (57) ABSTRACT

A memory device Post Package Repair (PPR) failure handling system includes a memory device having a first memory subsystem, and a memory management subsystem coupled to the memory device. The memory management subsystem identifies a first PPR request to perform first PPR operations on the first memory subsystem, and performs first PPR operations on the first memory subsystem based on the first current PPR request. The memory management subsystem may determine that the first PPR operations on the first memory subsystem have failed and, in response, increment a first PPR failure counter for the first memory subsystem, If, following the incrementing the first PPR failure counter for the first memory subsystem, the memory management subsystem determines that the first PPR failure counter for the first memory subsystem has reached a PPR failure count threshold, the memory management subsystem disables use of the memory device.

20 Claims, 7 Drawing Sheets

MEMORY DEVICE PPR FAILURE HANDLING SYSTEM

BACKGROUND

The present disclosure relates generally to information handling systems, and more particularly to handling Post Package Repair (PPR) failures in memory devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, table computing devices, mobile phones, and/or other computing devices known in the art, include memory devices having memory subsystems that can fail or otherwise become unavailable (e.g., Dual Inline Memory Module (DIMM) devices having Dynamic Random Access Memory (DRAM) subsystems that include address rows that can fail or otherwise become unavailable). Some computing devices are configured to perform Post Package Repair (PPR) in order to handle such memory subsystem unavailability by remapping access requests for the unavailable memory subsystem in the memory device (e.g., an unavailable address row in a DRAM subsystem of a DIMM device) to a spare/available memory subsystem in the memory device (e.g., a spare/available address row in a DRAM subsystem in the DIMM device), which operates to improve the reliability and performance of the memory system. However, the handling of memory subsystem unavailability in memory devices can raise some issues.

For example, the memory devices discussed above include a limited number of spare/available memory subsystems and, as such, once those spare/available memory subsystems have all been used to address unavailability of memory subsystems in the memory device, any subsequent unavailability of a memory subsystem in the memory device will result in a PPR failure due to the lack of any spare/available memory subsystem in that memory device for use in performing the access request remapping for the unavailable memory subsystem as described above. In conventional computing devices including processing systems available from Advanced Micro Devices (AMD®) Inc. of Santa Clara, California, United States, or processing systems available from INTEL® Corp. of Santa Clara, California, United States, when such PPR failures occur during reboot following a runtime PPR request to perform PPR (i.e., a runtime PPR request provided during an immediately previous runtime for the computing device), the PPR failure will be logged and the memory device including the unavailable memory subsystem will continue to be used, which presents the possibility of data loss, and can result in instabilities in the operation of the computing device that can cause it to "crash".

While computing devices with processing systems available from AMD® Inc. do not allow PPR to be initiated during boot (i.e., only the runtime PPR requests to perform PPR discussed above are available in such computing devices), computing devices with processing systems available from INTEL® Corp. allow boot PPR requests for PPR during advanced memory tests performed via Memory Reference Code (MRC) by the Basic Input/Output System (BIOS) during initialization operations for the computing device, and a PPR failure during such a boot PPR request will result in the immediate disabling of the memory device that includes the unavailable memory subsystem. However, the immediate disabling of memory devices in response to a PPR failure operates to reduce the available memory resources in the computing device, and often does so when there is still a possibility of recovering from the memory subsystem unavailability.

Accordingly, it would be desirable to provide a memory device PPR failure handling system that addresses the issues discussed above.

SUMMARY

According to one embodiment, an Information Handling System (IHS) includes a memory management processing system; and a memory management memory system that is coupled to the memory management processing system and that includes instructions that, when executed by the memory management processing system, cause the memory management processing system to provide a memory management engine that is configured to: identify a first Post Package Repair (PPR) request to perform first PPR operations on a first memory subsystem in a memory device that is included in a primary memory system that is coupled to the memory management processing system; perform, on the first memory subsystem based on the first current PPR request, first PPR operations; determine that the first PPR operations on the first memory subsystem have failed; increment, in response to determining that the first PPR operations on the first memory subsystem have failed, a first PPR failure counter for the first memory subsystem; determine, following the incrementing the first PPR failure counter for the first memory subsystem, that the first PPR failure counter for the first memory subsystem has reached a PPR failure count threshold; and disable, in response to determining the first PPR failure counter for the first memory subsystem has reached the PPR failure count threshold, use of the memory device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
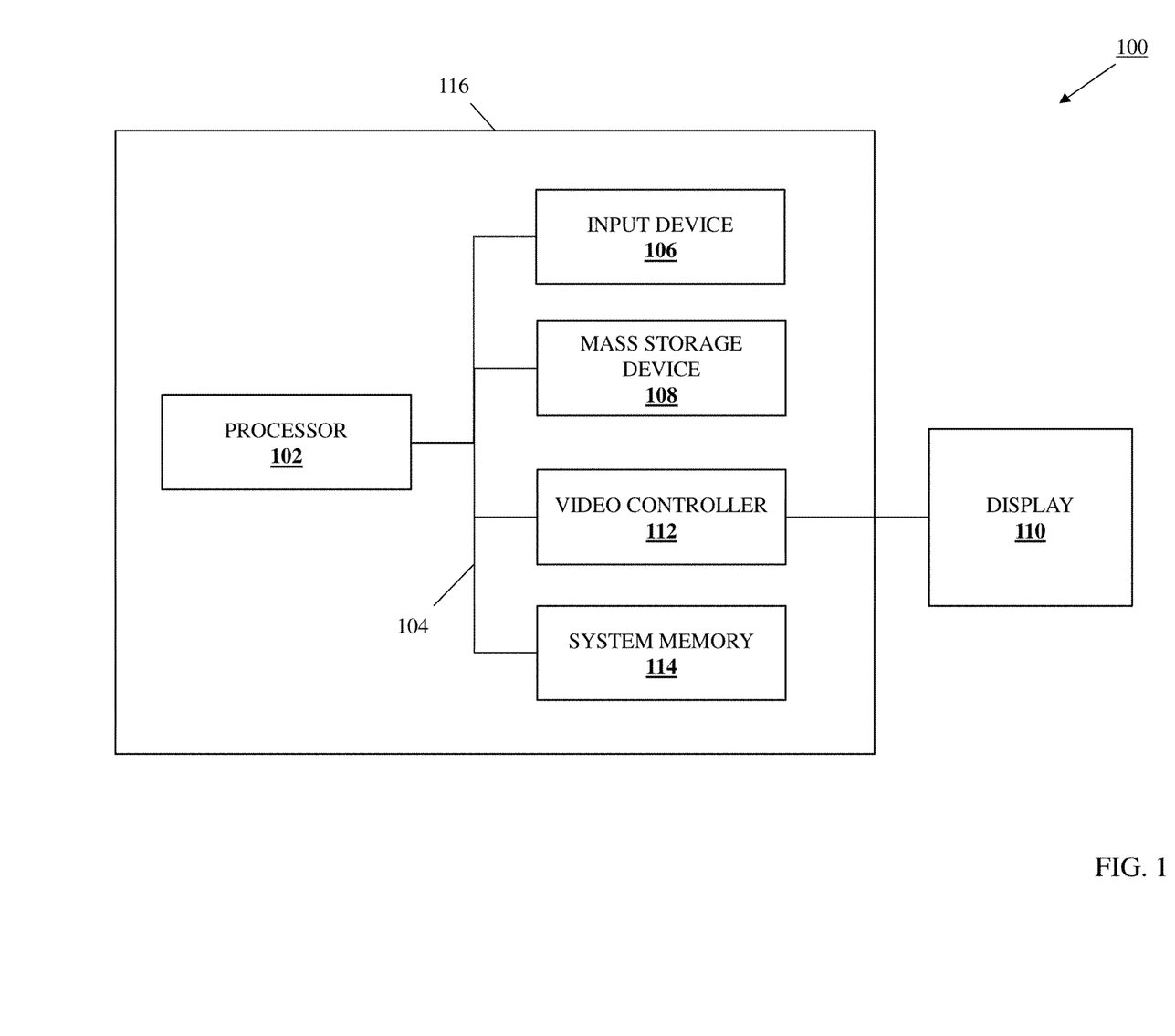
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
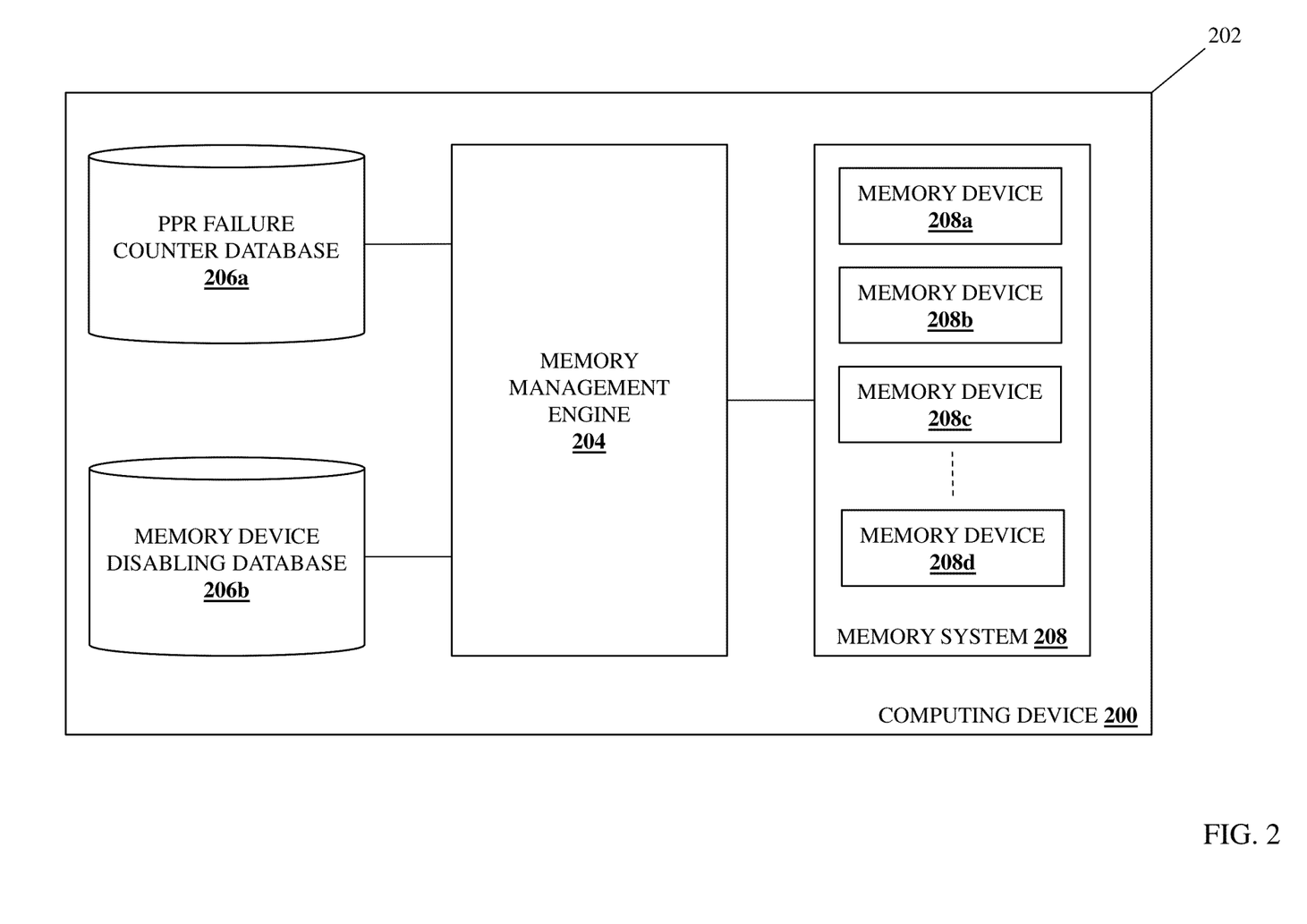
FIG. 2 is a schematic view illustrating an embodiment of a computing device that may include the memory device PPR failure handling system of the present disclosure.

Referring now to FIG. 2, an embodiment of a computing device 200 is illustrated that may provide the memory device PPR failure handling system of the present disclosure. In an embodiment, the computing device 200 may be provided by the IHS 100 discussed above with reference to FIG. 1, and/or may include some or all of the components of the IHS 100, and in specific examples may be provided by server devices, desktop computing devices, laptop/notebook computing devices, table computing devices, mobile phones, and/or other computing devices known in the art. However, while illustrated and discussed as being provided by particular computing devices, one of skill in the art in possession of the present disclosure will recognize that the computing device 200 may be provided by other devices that are configured to operate similarly as the computing device 200 discussed below.

In the illustrated embodiment, the computing device 200 includes a chassis 202 that houses the components of the computing device 200, only some of which are illustrated and described below. For example, the chassis 202 may house a memory management processing system and a memory management memory system that is coupled to the memory management processing system and that includes instructions that, when executed by the memory management processing system, cause the memory management processing system to provide a memory management engine 204 that is configured to perform the functionality of the memory management engines, memory management subsystems, and/or computing devices discussed below.

In one specific example, the computing device 200 may include a "primary" processing system (e.g., not illustrated, but which may be similar to the processor 102 discussed above with reference to FIG. 1 and may be provided by a Central Processing Unit (CPU)) available from AMD® Inc. of Santa Clara, California, United States, and the memory management engine 204 may be provided by AMD® firmware (e.g., a firmware processing system that provides the memory management processing system discussed above, and a firmware memory system that provides the memory management memory system discussed above). In another specific example, the computing device 200 may include a "primary" processing system (e.g., not illustrated, but which may be similar to the processor 102 discussed above with reference to FIG. 1 and may be provided by a CPU) available from INTEL® Corp. of Santa Clara, California, United States, and the memory management engine 204 may be provided by a Basic Input Output System (BIOS) (e.g., a BIOS processing system that provides the memory management processing system discussed above, and a BIOS memory system that provides the memory management memory system discussed above). However, while two specific examples have been provided, one of skill in the art in possession of the present disclosure will appreciate that the memory management engine 204 may be provided in a variety of manners while remaining within the scope of the present disclosure.

The chassis 202 may also house a storage system (not illustrated, but which may be similar to the storage 108 discussed above with reference to FIG. 1) that is coupled to the memory management engine 204 (e.g., via a coupling between the storage system and the memory management processing system) and that includes a PPR failure counter database 206a that is configured to store any of the PPR failure counter information utilized by the memory management engine 204 discussed below, and a memory device disabling database 206b that is configured to store any of the memory device disabling information utilized by the memory management engine 204 discussed below.

The chassis 202 may also house a memory system 208 that is coupled to the memory management engine 204 (e.g., via a coupling between the memory system 208 and the memory management processing system) and that may include a plurality of memory devices 208a, 208b, 208c, and up to 208d. As will be appreciated by one of skill in the art in possession of the present disclosure, the memory system 208 may be provided by a "primary" memory system that is utilized by the "primary" processing system discussed above, and thus the memory devices 208a-208d may be provided by Dual Inline Memory Module (DIMM) devices and/or other memory devices that one of skill in the art in possession of the present disclosure would recognize as being used by the CPUs described above. As discussed in further detail below, each of the memory devices 208a-208d in the memory system 208 may include a plurality of memory subsystems such as the Dynamic Random Access Memory (DRAM) subsystems in the DIMM devices described below, and each memory subsystem may include a plurality of rows in which data may be stored using any of a variety of data storage techniques known in the art. However, while specific memory devices and memory subsystems are described herein, one of skill in the art in possession of the present disclosure will recognize how the teachings of the present disclosure may be applied to a variety of memory device technologies while remaining within the scope of the present disclosure as well.

As such, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the memory device PPR failure handling functionality discussed below, while remaining within the scope of the present disclosure as well.

Figure 3:
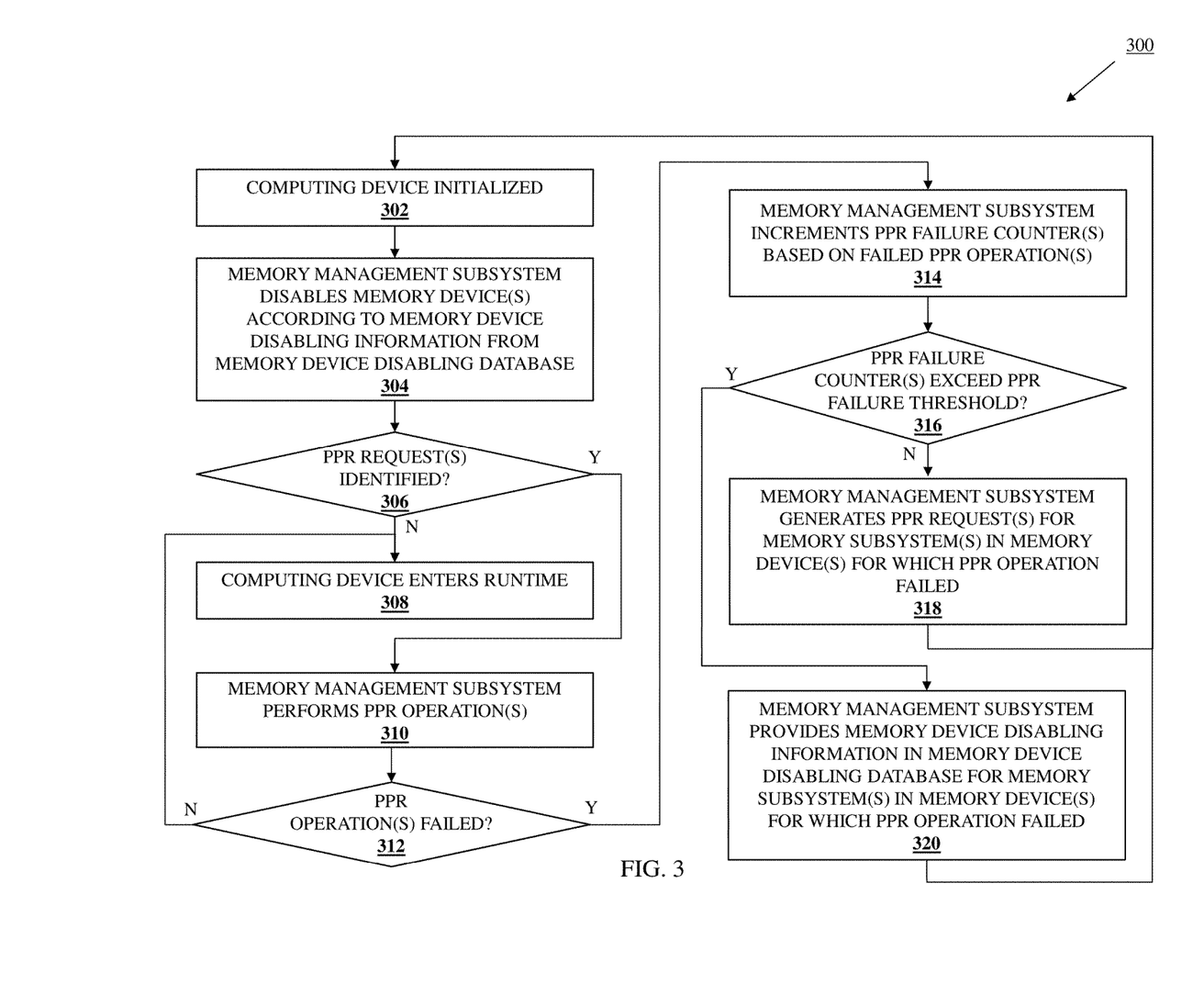
FIG. 3 is a flow chart illustrating an embodiment of a method for handling PPR failures in memory devices.

Referring now to FIG. 3, an embodiment of a method 300 for handling Post Package Repair (PPR) failures in memory devices is illustrated. As discussed below, the systems and methods of the present disclosure provide for the retrying of PPR operations on a memory subsystem a plurality of times in response to PPR operations failures prior to disabling use of a memory device that includes that memory subsystem. For example, the memory device PPR failure handling system of the present disclosure may include a memory device having a first memory subsystem, and a memory management subsystem coupled to the memory device. The memory management subsystem identifies a first PPR request to perform first PPR operations on the first memory subsystem, and performs first PPR operations on the first memory subsystem based on the first current PPR request. The memory management subsystem may determine that the first PPR operations on the first memory subsystem have failed and, in response, increment a first PPR failure counter for the first memory subsystem, If, following the incrementing the first PPR failure counter for the first memory subsystem, the memory management subsystem determines that the first PPR failure counter for the first memory subsystem has reached a PPR failure count threshold, the memory management subsystem disables use of the memory device. As such, data loss and instability that may result in computing device "crashes" due to memory subsystem unavailability may be prevented when possibility of memory subsystem unavailability recovery is relatively low.

The method 300 begins at block 302 where a computing device is initialized. In an embodiment, at block 302, the computing device 200 may be powered on, reset, rebooted, and/or otherwise initialized and, in response, initialization operations may be performed by the memory management engine 204. As will be appreciated by one of skill in the art in possession of the present disclosure, the initialization operations began at block 302 may include firmware initialization operations (e.g., pre-boot operations) performed by the AMD® firmware discussed above that may be included in computing devices with primary processing systems provided by AMD® Inc. of Santa Clara, California, United States, BIOS initialization operations (Power-On Start-Up (POST) operations) performed by the INTEL® BIOS discussed above that may be included in computing devices with primary processing systems provided by INTEL® Corp. of Santa Clara, California, United States, and/or other initialization operations that would be apparent to one of skill in the art in possession of the present disclosure. However, while two specific examples have been provided, one of skill in the art in possession of the present disclosure will appreciate how initialization operations for the computing device 200 may be performed in a variety of manners that will fall within the scope of the present disclosure.

The method 300 then proceeds to block 304 where a memory management subsystem disables memory devices according to memory device disabling information from a memory device disabling database. In an embodiment, at block 304 and during the initialization operations began at block 302, the memory management engine 204 may determine whether any of the memory devices 208a-208d in the memory system 208 should be disabled from being utilized during runtime of the computing device based on memory device disabling information in the memory device disabling database 206b. For example, in computing devices with primary processing systems provided by AMD Inc. of Santa Clara, California, United States, the AMD® firmware discussed above may not have access to memory device disabling information stored in the memory device disabling database 206b (discussed in further detail below), and thus that memory device disabling information may have previously been provided from the memory device disabling database 206b in a database that is accessible to the AMD® firmware (e.g., during the immediately previous runtime of the computing device 200), and thus the AMD® firmware may access that memory device disabling information via that database at block 304.

Figure 4:
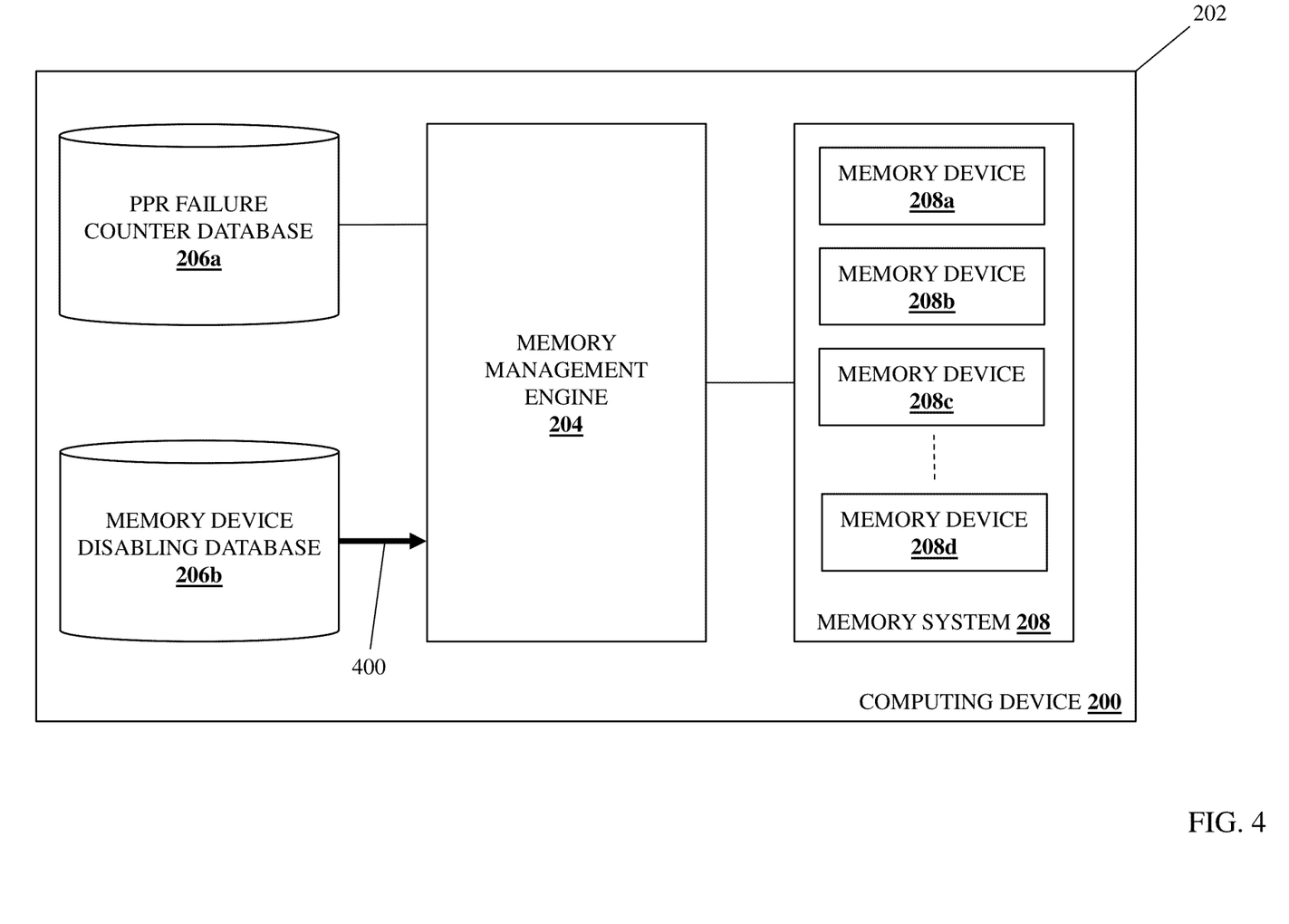
FIG. 4 is a schematic view illustrating an embodiment of the operation of the computing device of FIG. 2 during the method of FIG. 3.

In another example, in computing devices with primary processing systems provided by INTEL® Corp. of Santa Clara, California, United States, the INTEL® BIOS may have access to memory device disabling information stored in the memory device disabling database 206b (discussed in further detail below). As such, with reference to FIG. 4, at block 304 the memory management engine 204 may perform memory device disabling information retrieval operations 400 that include accessing the memory device disabling information in the memory device disabling database 206b. However, while two specific examples have been provided, one of skill in the art in possession of the present disclosure will appreciate how the memory device disabling information of the present disclosure may be retrieved in a variety of manners that will fall within the scope of the present disclosure.

In this example of the method 300, the memory device disabling information does not provide for the disabling of any of the memory devices 208a-208d in the memory system 208, and thus the memory management engine 204 may access the memory device disabling information and determine that it does not provide for the disabling of any memory devices. However, as described below, as memory subsystems in the memory devices 208a-208d of the memory system 208 fail or otherwise become unavailable and PPR operations for those memory subsystems fail a threshold number of times, the memory device disabling information will provide for the disabling of the memory device(s) in the memory system 208 that include those memory subsystems.

The method 300 then proceeds to decision block 306 where the method 300 proceeds depending on whether one or more PPR requests are identified. In an embodiment, at decision block 306 and during the initialization operations began at block 302, the memory management engine 204 may operate based on whether PPR request(s) are identified. As will be appreciated by one of skill in the art in possession of the present disclosure, in computing devices with primary processing systems provided by AMD® Inc. of Santa Clara, California, United States, PPR operations may have been requested during a runtime of the computing 200 that occurred immediately prior to the initialization operations that began at block 302. As such, a runtime portion of the memory management engine 204 may have detected one or more memory subsystem failures or other unavailability's during that runtime, and may have then generated, set, and/or otherwise provided corresponding PPR request(s) in a PPR request database (not illustrated) that is accessible to the AMD® firmware that is included in the memory management engine 204 during the initialization operations that began at block 302. Thus, at decision block 306 and during the initialization operations that began at block 302, the AMD® firmware that is included in the memory management engine 204 may determine whether PPR request(s) are provided in its PPR request database.

Similarly, in computing devices with primary processing systems provided by INTEL® Corp. of Santa Clara, California, United States, PPR operations may be requested during the initialization operations that began at block 302 (e.g., during advanced memory tests performed via MRC by the INTEL® BIOS), or may have been requested during a runtime of the computing 200 that occurred immediately prior to the initialization operations that began at block 302. As such, the INTEL BIOS included in the memory management engine 204 may detect one or more memory subsystem failures or other unavailability's during initialization or runtime, and then generate, set, and/or otherwise provide corresponding PPR request(s) in a PPR request database (not illustrated) that is accessible to the INTEL® BIOS that is included in the memory management engine 204 during the initialization operations that began at block 302. Thus, at decision block 306 and during the initialization operations that began at block 302, the INTEL® BIOS that is included in the memory management engine 204 may determine whether PPR request(s) are provided in its PPR request database. However, while two specific examples have been provided, one of skill in the art in possession of the present disclosure will appreciate how PPR requests for failed or otherwise unavailable memory subsystems may be provided in a variety of manners that will fall within the scope of the present disclosure.

If, at decision block 306, PPR request(s) are not identified, the method 300 proceeds to block 308 where the computing device enters runtime. In an embodiment, at block 308 and following the completion of the initialization operations that began at block 302, the computing device 200 may enter a runtime state in which an operating system takes control of the computing device 200. As described above, during runtime operations performed while the computing device 200 is in the runtime state, one or more memory subsystems in the memory device(s) 208a-208d of the memory system 208 may fail or otherwise become unavailable and, in response, the memory management engine 204 may generate, set, and/or otherwise provide corresponding PPR request(s) similarly as described above.

Figure 5:
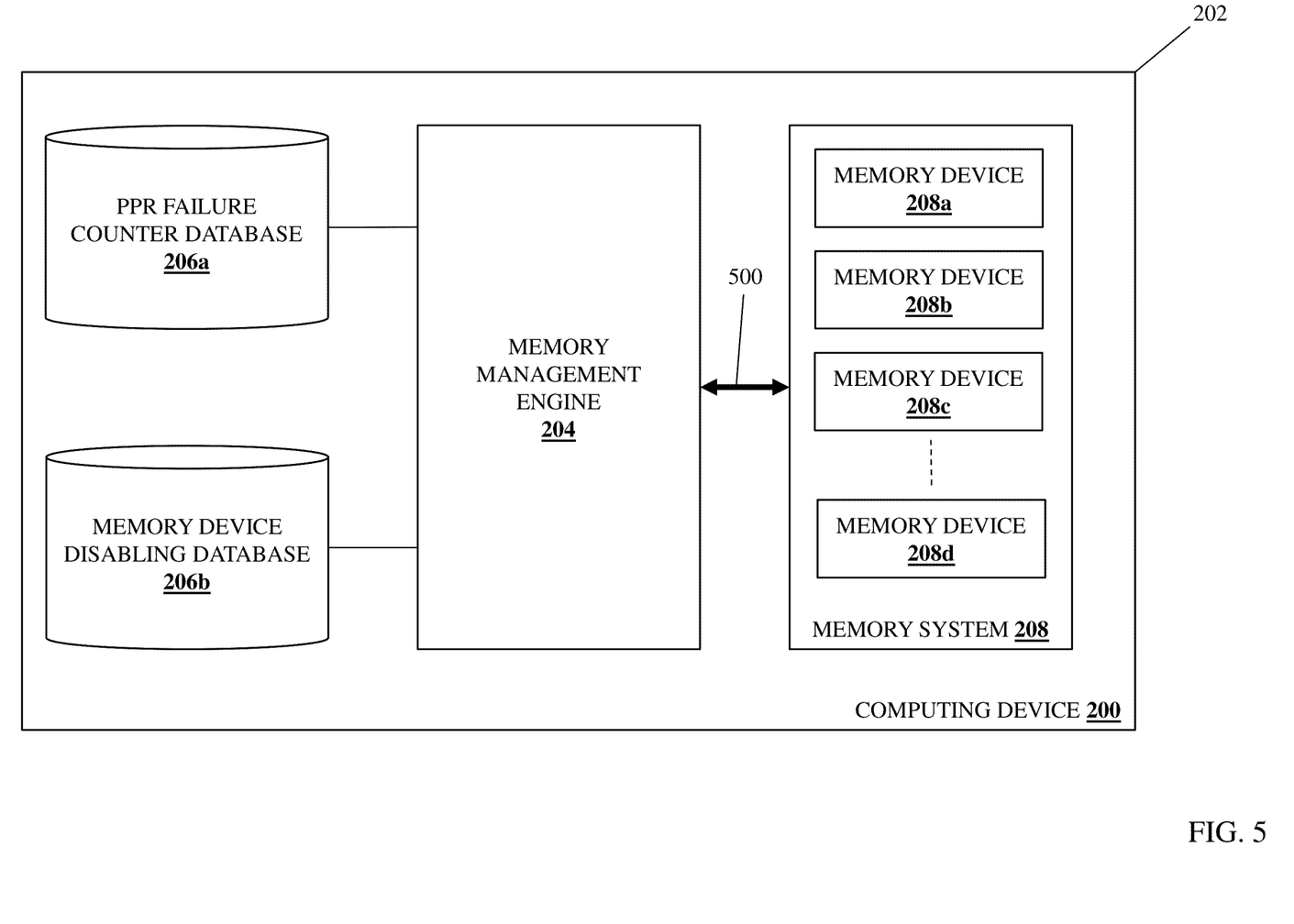
FIG. 5 is a schematic view illustrating an embodiment of the operation of the computing device of FIG. 2 during the method of FIG. 3.

If, at decision block 306, PPR request(s) are identified, the method 300 proceeds to block 310 where the memory management subsystem performs one or more PPR operations. With reference to FIG. 5, in an embodiment of block 310 and during the initialization operations began at block 302, the memory management engine 204 may perform PPR operations 500 on any memory subsystem in any of the memory devices 208a-208d for which a PPR request was identified at decision block 306. As will be appreciated by one of skill in the art in possession of the present disclosure, such PPR operations for a memory subsystem in any memory device may include identifying whether the memory device with the unavailable memory subsystem includes a spare/available memory subsystem (e.g., whether a DIMM device with an unavailable row in a DRAM subsystem for which the PPR request was received includes a spare/available row in one of its DRAM subsystems) and, if so, "remapping" the logical addresses range(s) of the unavailable memory subsystem to the spare/available memory subsystem. However, while a specific, simplified example of PPR operations has been described, one of skill in the art in possession of the present disclosure will appreciate that a variety of other PPR operations may be performed at block 310 while remaining within the scope of the present disclosure as well.

The method 300 then proceeds to decision block 312 where the method 300 proceeds depending on whether one or more PPR operations failed. As discussed above and as will be appreciated by one of skill in the art in possession of the present disclosure, the number of successful PPR operations that may be performed in a memory device is limited due to the limited amount of spare/available memory subsystems in the memory device that may be used as described above. As such, any particular PPR operation discussed above may result in the memory management engine 204 failing to identify a spare/available memory subsystem in the memory device with the unavailable memory subsystem for which a PPR request was identified at decision block 306 and, at decision block 312, that PPR operation will fail. However, while a specific, simplified example of a failed PPR operation has been described, one of skill in the art in possession of the present disclosure will appreciate that PPR operations may fail in a variety of manners (including PPR operation failures that occur when spare/available memory subsystems exist in the memory device) while remaining within the scope of the present disclosure as well.

If, at decision block 312, PPR operation(s) did not fail, the method 300 proceeds to block 308 where the computing device enters runtime. As discussed above, at block 308 and following the completion of the initialization operations that began at block 302, the computing device 200 may enter a runtime state in which an operating system takes control of the computing device 200. As such, the computing device 200 may enter runtime if PPR operations on unavailable memory subsystems are successful during its initialization at block 310, and as described above, one or more memory subsystems in the memory device(s) 208a-208d of the memory system 208 may fail or otherwise become unavailable during that runtime and, in response, the memory management engine 204 may generate, set, and/or otherwise provide corresponding PPR request(s) similarly as described above.

Figure 6:
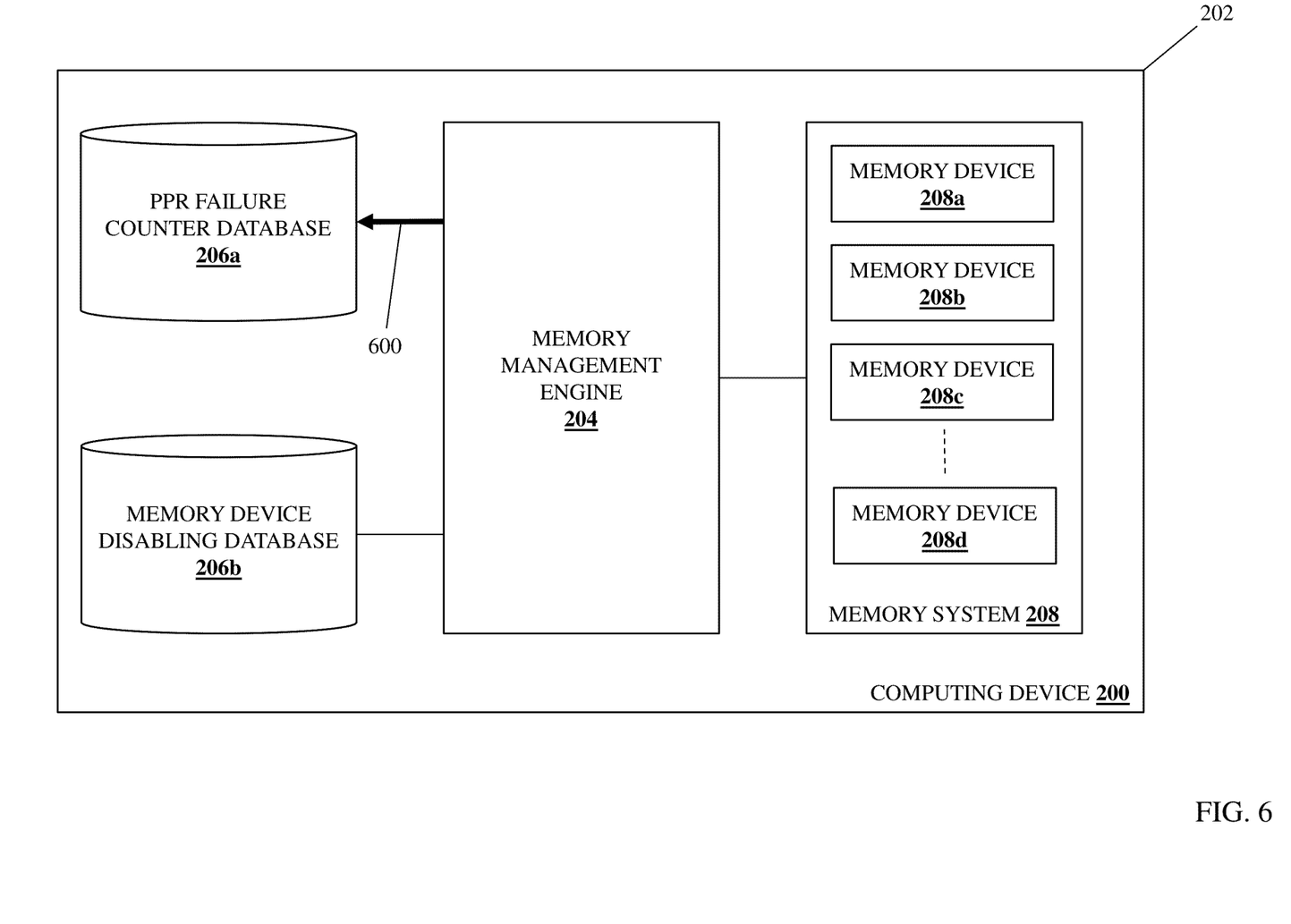
FIG. 6 is a schematic view illustrating an embodiment of the operation of the computing device of FIG. 2 during the method of FIG. 3.

If, at decision block 312, PPR operation(s) failed, the method 300 proceeds to block 314 where the memory management subsystem increments one or more PPR failure counters based on the failed PPR operation(s). With reference to FIG. 6, in an embodiment of block 314, the memory management engine 204 may perform PPR failure counter incrementing operations 600 that may include incrementing a PPR failure counter in the PPR failure counter database 206a that is associated with the PPR operation that failed at decision block 312. As will be appreciated by one of skill in the art in possession of the present disclosure, the incrementing of any PPR failure counter for a corresponding PPR operation failure at block 314 may include incrementing a PPR failure counter associated with an unavailable memory subsystem for which PPR operations failure. As such, the first time a PPR operation fails for a unavailable memory subsystem, a PPR failure counter may be created, generated, and/or otherwise provided in the PPR failure counter database 206a and incremented (or initially provided) to indicate a PPR failure count of "1", and any subsequent failure of a PPR operation for that unavailable memory subsystem without an intervening successful PPR operation will result in the incrementing of that PPR failure counter (e.g., to "2" on a second PPR operation failure, to "3" on a third PPR operation failure, etc.).

As will be appreciated by one of skill in the art in possession of the present disclosure, each memory subsystem in a memory device (e.g., each row in a DRAM subsystem of a DIMM device) that becomes unavailable and upon which PPR operations are requested and performed will be provided a PPR failure counter in the PPR failure counter database in order to track the number of PPR operation failures for PPR operations performed on that memory subsystem. As such, any of the memory devices 208a-208d may have a plurality of PPR failure counters provided for its memory subsystems in the PPR failure counter database 206a at any given time (e.g., a respective PPR failure counter for each row in the DRAM subsystems of a DIMM device that is currently unavailable). However, while a few specific examples of PPR failure counters and their use has been described, one of skill in the art in possession of the present disclosure will appreciate how the failure of PPR operations and the tracking thereof may be performed in a variety of manners that will fall within the scope of the present disclosure as well.

The method 300 then proceeds to decision block 316 where the method 300 proceeds depending on whether one or more PPR failure counters exceed a PPR failure threshold. In an embodiment, at decision block 316 and subsequent to (or as part of) incrementing PPR failure counter(s) in the PPR failure counter database 206a at block 314, the memory management engine 204 may determine whether the PPR failure count in that PPR failure counter exceeds a PPR failure count threshold. To provide a specific example, the PPR failure count threshold may be set at "3", although one of skill in the art in possession of the present disclosure will appreciate how different PPR failure count thresholds may be provided based on a variety of factors in order to, for example, provide for the disabling of memory devices based on PPR operation failures only when the number of those PPR operation failures indicates a threshold unlikeliness of the recovery from a memory subsystem unavailability (e.g., when only a 15% chance exists of recovery from that memory subsystem unavailability with further PPR operations). However, while a specific example of PPR failure count thresholds and their use has been described, one of skill in the art in possession of the present disclosure will appreciate how a variety of PPR failure count thresholds and the use thereof will fall within the scope of the present disclosure as well.

If, at decision block 316, no PPR failure counters exceed the PPR failure threshold, the method 300 proceeds to block 318 where the memory management subsystem generates one or more PPR requests for memory subsystem(s) in memory device(s) for which a PPR operation failed. In an embodiment, at block 318 and in response to the failure of PPR operation(s) on memory subsystem(s) that do not result the respective PPR failure count for those memory subsystem(s) exceeding the PPR failure count threshold, the memory management engine 204 may generate, set, and/or otherwise provide a PPR request for each of those memory subsystem(s) in the PPR request database that is accessible to the memory management engine 204 during a subsequent boot of the computing device 200 as described above.

The method 300 then returns to block 302. As will be appreciated by one of skill in the art in possession of the present disclosure, as part of the initialization of the computing device 200 that began at block 302, the provisioning of the PPR request(s) at block 318 in response to failed PPR operation(s) will be followed by a reset or reboot of the computing device 200 (e.g., a reset or reboot initiated by the memory management engine 204) so that those PPR operations may be performed based on those PPR requests. As such, the method 300 may loop such that, on the subsequent performance of the method 300 during the subsequent initialization of the computing device 200, those PPR requests will be identified at decision block 306 and corresponding PPR operations will be performed at block 310. As will be appreciated by one of skill in the art in possession of the present disclosure, if those PPR operations are successful, the computing device 200 will enter runtime at block 308, while if those PPR operations are not successful, corresponding PPR failure counters will be incremented and, if the PPR failure count of those PPR failure counters does not exceed a PPR failure count threshold, another PPR request will be generated. As such, for any particular unavailable memory subsystem, PPR operations may repeatedly be performed until they succeed, or until they fail a number of times that exceeds the PPR failure count threshold.

Furthermore, for any unavailable memory subsystem for which PPR operations initially fail such that a PPR failure counter is provided in the PPR failure counter database 206b and incremented one or more times, a subsequent success of PPR operations prior to that PPR failure counter having a PPR failure count that exceeds the PPR failure count threshold may result in the management engine 204 erasing, deleting, and/or otherwise removing that PPR failure counter from the PPR failure counter database 206b. As will be appreciated by one of skill in the art in possession of the present disclosure, the memory device PPR failure handling system of the present disclosure may be primarily concerned with multiple consecutive PPR operation failures that are indicative that recovery from the memory subsystem unavailability is relatively low, and thus the recovery from that memory subsystem unavailability may "reset" the number of PPR operation failures required to disable its memory device.

Figure 7:
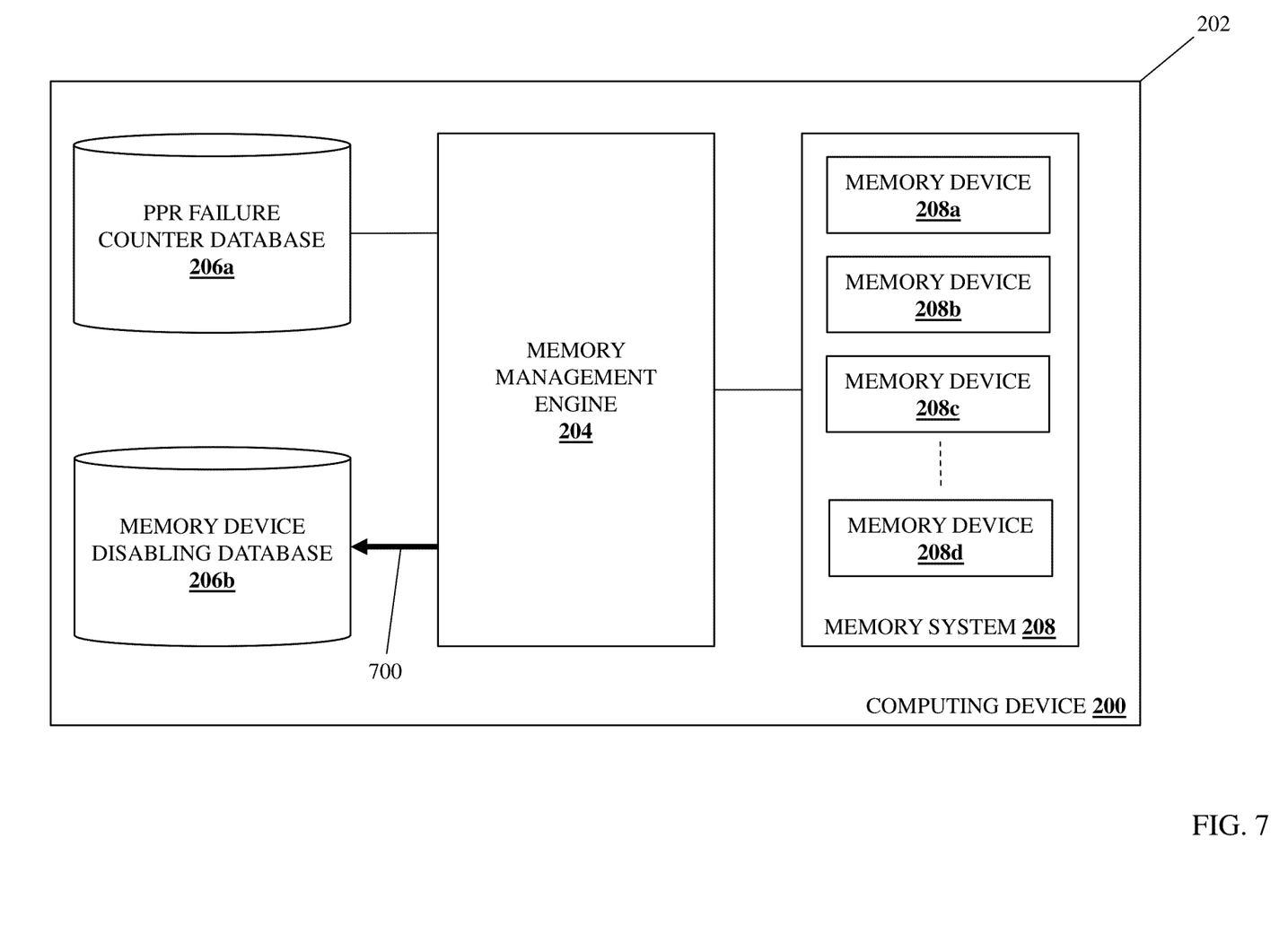
FIG. 7 is a schematic view illustrating an embodiment of the operation of the computing device of FIG. 2 during the method of FIG. 3.

If, at decision block 316, PPR failure counter(s) exceed the PPR failure threshold, the method 300 proceeds to block 320 where the memory management subsystem provides memory device disabling information in the memory device disabling database for memory subsystem(s) in memory device(s) for which a PPR failure counter includes a PPR failure count that exceed the PPR failure count threshold. With reference to FIG. 7, in an embodiment of block 320 and in response to PPR failure count(s) in PPR failure counter(s) reaching the PPR failure count threshold, the memory management engine 204 may perform memory device disabling information provisioning operations 700 that may include generating and storing memory device disabling information in the memory device disabling database 206b for the memory subsystem(s) whose PPR failure counters include PPR failure counts that exceed the PPR failure count threshold.

For example, for any unavailable memory subsystem (e.g., a row in a DRAM subsystem of a DIMM device) with an associated PPR failure counter that includes a PPR failure count that exceeds the PPR failure count threshold, the memory management engine 204 may identify a corresponding memory device address range for the memory device that includes that memory subsystem, and provide that memory device address range in the memory device disabling database 206b as the memory device disabling information for that memory device (e.g., in order to "map out" that memory device at a subsequent performance of block 304). As such, in the event a row of a memory subsystem in the memory device 208a is unavailable and includes an associated PPR failure counter in the PPR failure counter database 206a that includes a PPR failure count that exceeds the PPR failure count threshold, the memory management engine 204 may identify a corresponding memory device address range for the memory device 208a and provide that memory device address range in the memory device disabling database 206b as the memory device disabling information for that memory device 208a (e.g., in order to "map out" the memory device 304a at a subsequent performance of block 304). However, while a specific example of the disabling of memory devices has been described, one of skill in the art in possession of the present disclosure will appreciate how memory devices may be disabled in a variety of manners that will fall within the scope of the present disclosure as well.

As discussed above, in computing devices with primary processing systems provided by INTEL® Corp. of Santa Clara, California, United States, the INTEL® BIOS may have access to memory device disabling information stored in the memory device disabling database 206b. However, as also discussed above, in computing devices with primary processing systems provided by AMD® Inc. of Santa Clara, California, United States, the memory device disabling information stored in the memory device disabling database 206b may subsequently be provided in a database that is accessible to the AMD® firmware so that the AMD® firmware may access that memory device disabling information via that database.

The method 300 then returns to block 302. As will be appreciated by one of skill in the art in possession of the present disclosure, as part of the initialization of the computing device 200 that began at block 302, the provisioning of the memory device disabling information in the memory device disabling database 206b at block 320 will be followed by a reset or reboot of the computing device 200 (e.g., a reset or reboot initiated by the memory management engine 204). As such, the method 300 may loop such that, on the subsequent performance of the method 300 and during the subsequent initialization of the computing device 200, that memory device disabling information may be used at block 304 to disable memory device(s) that include memory subsystems with PPR failure counters having PPR failure counts that exceed the PPR failure count threshold, and any memory subsystems unavailability will either be recovered from via PPR operations or have their memory device disabled so that the computing device 200 may enter runtime without allowing the use of unavailable memory subsystems.

Thus, systems and methods have been described that provide for the retrying of PPR operations on a memory subsystem a plurality of times in response to PPR operations failures prior to disabling use of a memory device that includes that memory subsystem. For example, the memory device PPR failure handling system of the present disclosure may include a memory device having a first memory subsystem, and a memory management subsystem coupled to the memory device. The memory management subsystem identifies a first PPR request to perform first PPR operations on the first memory subsystem, and performs first PPR operations on the first memory subsystem based on the first current PPR request. The memory management subsystem may determine that the first PPR operations on the first memory subsystem have failed and, in response, increment a first PPR failure counter for the first memory subsystem, If, following the incrementing the first PPR failure counter for the first memory subsystem, the memory management subsystem determines that the first PPR failure counter for the first memory subsystem has reached a PPR failure count threshold, the memory management subsystem disables use of the memory device. As such, data loss and instability that may result in computing device "crashes" due to memory subsystem unavailability may be prevented when possibility of recovery from the memory subsystem unavailability is relatively low.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A memory device Post Package Repair (PPR) failure handling system, comprising:
   a memory device including a first memory subsystem; and
   a memory management subsystem that is coupled to the memory device and that is configured to:
      identify a first Post Package Repair (PPR) request to perform first PPR operations on the first memory subsystem;
      perform, on the first memory subsystem based on the first current PPR request, first PPR operations;
      determine that the first PPR operations on the first memory subsystem have failed;
      increment, in response to determining that the first PPR operations on the first memory subsystem have failed, a first PPR failure counter for the first memory subsystem;
      determine, following the incrementing the first PPR failure counter for the first memory subsystem, that the first PPR failure counter for the first memory subsystem has reached a PPR failure count threshold; and disable, in response to determining the first PPR failure counter for the first memory subsystem has reached the PPR failure count threshold, use of the memory device.

2. The system of claim 1, wherein the memory device is provided by a Dual Inline Memory Module (DIMM) device, and wherein the first memory subsystem is provided by a row in Dynamic Random Access Memory (DRAM) subsystem.

3. The system of claim 1, wherein the disabling the use of the memory device includes identifying the memory device in a memory device map out database in order to prevent the memory device from being made available for use during subsequent initialization operations.

4. The system of claim 1, wherein the memory management subsystem is configured, prior to identifying the first PPR request, to:
identify a second PPR request to perform second PPR operations on the first memory subsystem;
perform, on the first memory subsystem based on the second PPR request, second PPR operations;
determine that the second PPR operations on the first memory subsystem have failed;
increment, in response to determining that the second PPR operations on the first memory subsystem have failed, the first PPR failure counter for the first memory subsystem;
determine, following the incrementing the first PPR failure counter for the first memory subsystem, that the first PPR failure counter for the first memory subsystem has not reached the PPR failure count threshold; and
generate, in response to determining that the first PPR failure counter for the first memory subsystem has not reached the PPR failure count threshold, the first PPR request.

5. The system of claim 1, wherein the memory device includes a second memory subsystem and the management subsystem is configured to:
identify a second PPR request to perform second PPR operations on the second memory subsystem;
perform, on the second memory subsystem based on the second current PPR request, second PPR operations;
determine that the second PPR operations on the second memory subsystem have failed;
increment, in response to determining that the second PPR operations on the second memory subsystem have failed, a second PPR failure counter for the second memory subsystem;
determine, following the incrementing the second PPR failure counter for the second memory subsystem, that the second PPR failure counter for the second memory subsystem has not reached the PPR failure count threshold; and
generate, in response to determining that the second PPR failure counter for the second memory subsystem has not reached the PPR failure count threshold, a third PPR request.

6. The system of claim 5, wherein the management subsystem is configured to:
identify a third PPR request to perform third PPR operations on the second memory subsystem;
perform, on the second memory subsystem based on the third current PPR request, third PPR operations;
determine that the third PPR operations on the second memory subsystem have succeeded; and
reset, in response to determining that the third PPR operations on the second memory subsystem have succeeded, a second PPR failure counter for the second memory subsystem.

7. An Information Handling System (IHS), comprising:
a memory management processing system; and
a memory management memory system that is coupled to the memory management processing system and that includes instructions that, when executed by the memory management processing system, cause the memory management processing system to provide a memory management engine that is configured to:
identify a first Post Package Repair (PPR) request to perform first PPR operations on a first memory subsystem in a memory device that is included in a primary memory system that is coupled to the memory management processing system;
perform, on the first memory subsystem based on the first current PPR request, first PPR operations;
determine that the first PPR operations on the first memory subsystem have failed;
increment, in response to determining that the first PPR operations on the first memory subsystem have failed, a first PPR failure counter for the first memory subsystem;
determine, following the incrementing the first PPR failure counter for the first memory subsystem, that the first PPR failure counter for the first memory subsystem has reached a PPR failure count threshold; and
disable, in response to determining the first PPR failure counter for the first memory subsystem has reached the PPR failure count threshold, use of the memory device.

8. The IHS of claim 7, wherein the memory device is provided by a Dual Inline Memory Module (DIMM) device, and wherein the first memory subsystem is provided by a row in Dynamic Random Access Memory (DRAM) subsystem.

9. The IHS of claim 7, wherein the disabling the use of the memory device includes identifying the memory device in a memory device map out database in order to prevent the memory device from being made available for use during subsequent initialization operations.

10. The IHS of claim 7, wherein the memory management engine is configured, prior to identifying the first PPR request, to:
identify a second PPR request to perform second PPR operations on the first memory subsystem;
perform, on the first memory subsystem based on the second PPR request, second PPR operations;
determine that the second PPR operations on the first memory subsystem have failed;
increment, in response to determining that the second PPR operations on the first memory subsystem have failed, the first PPR failure counter for the first memory subsystem;
determine, following the incrementing the first PPR failure counter for the first memory subsystem, that the first PPR failure counter for the first memory subsystem has not reached the PPR failure count threshold; and
generate, in response to determining that the first PPR failure counter for the first memory subsystem has not reached the PPR failure count threshold, the first PPR request.

11. The IHS of claim 10, wherein the memory management engine is configured to:

cause the IHS to reboot following the generation of the first PPR request; and
identify the first PPR request during initialization operations that are performed in response to the reboot.

12. The IHS of claim 7, wherein the memory device includes a second memory subsystem and the management engine is configured to:
identify a second PPR request to perform second PPR operations on the second memory subsystem;
perform, on the second memory subsystem based on the second current PPR request, second PPR operations;
determine that the second PPR operations on the second memory subsystem have failed;
increment, in response to determining that the second PPR operations on the second memory subsystem have failed, a second PPR failure counter for the second memory subsystem;
determine, following the incrementing the second PPR failure counter for the second memory subsystem, that the second PPR failure counter for the second memory subsystem has not reached the PPR failure count threshold; and
generate, in response to determining that the second PPR failure counter for the second memory subsystem has not reached the PPR failure count threshold, a third PPR request.

13. The IHS of claim 12, wherein the management engine is configured to:
identify a third PPR request to perform third PPR operations on the second memory subsystem;
perform, on the second memory subsystem based on the third current PPR request, third PPR operations;
determine that the third PPR operations on the second memory subsystem have succeeded; and
reset, in response to determining that the third PPR operations on the second memory subsystem have succeeded, a second PPR failure counter for the second memory subsystem.

14. A method for handling Post Package Repair (PPR) failures in memory devices, comprising:
identifying, by a memory management subsystem, a first Post Package Repair (PPR) request to perform first PPR operations on a first memory subsystem in a memory device;
performing, by the memory management subsystem on the first memory subsystem based on the first current PPR request, first PPR operations;
determining, by the memory management subsystem, that the first PPR operations on the first memory subsystem have failed;
incrementing, by the memory management subsystem in response to determining that the first PPR operations on the first memory subsystem have failed, a first PPR failure counter for the first memory subsystem;
determining, by the memory management subsystem following the incrementing the first PPR failure counter for the first memory subsystem, that the first PPR failure counter for the first memory subsystem has reached a PPR failure count threshold; and
disabling, by the memory management subsystem in response to determining the first PPR failure counter for the first memory subsystem has reached the PPR failure count threshold, use of the memory device.

15. The method of claim 14, wherein the memory device is provided by a Dual Inline Memory Module (DIMM) device, and wherein the first memory subsystem is provided by a row in Dynamic Random Access Memory (DRAM) subsystem.

16. The method of claim 14, wherein the disabling the use of the memory device includes identifying the memory device in a memory device map out database in order to prevent the memory device from being made available for use during subsequent initialization operations.

17. The method of claim 14, further comprising:
identifying, by the memory management subsystem prior to identifying the first PPR request, a second PPR request to perform second PPR operations on the first memory subsystem;
performing, by the memory management subsystem on the first memory subsystem based on the second PPR request and prior to identifying the first PPR request, second PPR operations;
determining, by the memory management subsystem prior to identifying the first PPR request, that the second PPR operations on the first memory subsystem have failed;
incrementing, by the memory management subsystem in response to determining that the second PPR operations on the first memory subsystem have failed and prior to identifying the first PPR request, the first PPR failure counter for the first memory subsystem;
determining, by the memory management subsystem following the incrementing the first PPR failure counter for the first memory subsystem and prior to identifying the first PPR request, that the first PPR failure counter for the first memory subsystem has not reached the PPR failure count threshold; and
generating, by the memory management subsystem in response to determining that the first PPR failure counter for the first memory subsystem has not reached the PPR failure count threshold and prior to identifying the first PPR request, the first PPR request.

18. The method of claim 17, further comprising:
causing, by the memory management subsystem, a computing device that includes the memory device to reboot following the generation of the first PPR request; and
identifying, by the memory management subsystem, the first PPR request during initialization operations that are performed in response to the reboot.

19. The method of claim 14, further comprising:
identifying, by the memory management subsystem, a second PPR request to perform second PPR operations on a second memory subsystem in the memory device;
performing, by the memory management subsystem on the second memory subsystem based on the second current PPR request, second PPR operations;
determining, by the memory management subsystem, that the second PPR operations on the second memory subsystem have failed;
incrementing, by the memory management subsystem in response to determining that the second PPR operations on the second memory subsystem have failed, a second PPR failure counter for the second memory subsystem;
determining, by the memory management subsystem following the incrementing the second PPR failure counter for the second memory subsystem, that the second PPR failure counter for the second memory subsystem has not reached the PPR failure count threshold; and
generating, by the memory management subsystem in response to determining that the second PPR failure counter for the second memory subsystem has not reached the PPR failure count threshold, a third PPR request.

20. The method of claim 19, further comprising:

identifying, by the memory management subsystem, a third PPR request to perform third PPR operations on the second memory subsystem;

performing, by the memory management subsystem on the second memory subsystem based on the third current PPR request, third PPR operations;

determining, by the memory management subsystem, that the third PPR operations on the second memory subsystem have succeeded; and resetting, by the memory management subsystem in response to determining that the third PPR operations on the second memory subsystem have succeeded, a second PPR failure counter for the second memory subsystem.

* * * * *